(12) United States Patent
Winzer et al.

(10) Patent No.: US 9,438,004 B2
(45) Date of Patent: Sep. 6, 2016

(54) OPTICAL PUMPING AND POWERING IN SPATIALLY MULTIPLEXED TRANSMISSION LINKS

(75) Inventors: Peter J. Winzer, Aberdeen, NJ (US); Andrew R. Chraplyvy, Matawan, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1173 days.

(21) Appl. No.: 13/112,147

(22) Filed: May 20, 2011

(65) Prior Publication Data

US 2012/0294607 A1 Nov. 22, 2012

(51) Int. Cl.
| | |
|---|---|
| *G02B 6/26* | (2006.01) |
| *G02B 6/34* | (2006.01) |
| *G02B 6/42* | (2006.01) |
| *H01S 3/094* | (2006.01) |
| *H04B 10/291* | (2013.01) |

(Continued)

(52) U.S. Cl.
CPC ..... *H01S 3/094061* (2013.01); *H04B 10/2912* (2013.01); *H04J 14/04* (2013.01); *G02B 6/02042* (2013.01); *G02B 6/02095* (2013.01); *H01S 3/06754* (2013.01); *H01S 3/094096* (2013.01); *H01S 3/2383* (2013.01); *H01S 3/302* (2013.01); *H04J 14/02* (2013.01)

(58) Field of Classification Search
CPC .. G02B 6/34; G02B 6/12007; G02B 6/4214; G02B 6/2817; G02B 6/2821; G02F 1/3132
USPC .......... 385/14, 15, 24, 48, 50, 129–132, 30, 385/36, 37, 41, 42
See application file for complete search history.

(56) References Cited

U.S. PATENT DOCUMENTS

| 5,016,967 A | 5/1991 | Meltz et al. |
| 5,617,234 A * | 4/1997 | Koga et al. .................... 398/14 |

(Continued)

FOREIGN PATENT DOCUMENTS

JP WO 2011052373 A1 * 5/2011 ........... G02B 6/2804

OTHER PUBLICATIONS

Roger, M. et al., "Optically powered fiber networks," Optics Express, 2008, vol. 16, Issue 26, pp. 21821-21834.

(Continued)

*Primary Examiner* — Kaveh C Kianni
*Assistant Examiner* — Hung Lam
(74) *Attorney, Agent, or Firm* — Mendelsohn Dunleavy, P.C.; Yuri Gruzdkov

(57) ABSTRACT

A spatially multiplexed optical link having a plurality of transmission paths, wherein at least one transmission path is configured to carry an optical-pump signal while one or more other transmission paths carry data-bearing signals. Disposed within the optical link are an optical signal-distribution module and an amplifier module. The optical signal-distribution module is configured to couple portions of the optical-pump signal into the data-bearing transmission paths. The amplifier module is configured to amplify the data-bearing signals using these portions of the optical-pump signal as a power source in a suitable all-optical amplification scheme. The optical-pump signal can optionally be tapped and applied to a photovoltaic element configured to directly power a device, e.g., an optical performance monitor, or to charge the battery of that device to enable its autonomous operation if external electrical power is not available where the device is deployed.

20 Claims, 4 Drawing Sheets

(51) Int. Cl.
  *H04J 14/04* (2006.01)
  *H01S 3/067* (2006.01)
  *H01S 3/23* (2006.01)
  *H01S 3/30* (2006.01)
  *G02B 6/02* (2006.01)
  *H04J 14/02* (2006.01)

(56) References Cited

U.S. PATENT DOCUMENTS

| | | | |
|---|---|---|---|
| 5,771,114 A * | 6/1998 | Andersson et al. | 398/38 |
| 6,704,509 B1 | 3/2004 | Yang et al. | |
| 7,035,505 B2 | 4/2006 | Shen et al. | |
| 7,068,944 B2 | 6/2006 | Sorin | |
| 7,072,588 B2 | 7/2006 | Skinner | |
| 7,130,505 B2 | 10/2006 | Shen | |
| 7,164,526 B2 | 1/2007 | McKinstrie et al. | |
| 7,171,130 B2 | 1/2007 | Fishteyn et al. | |
| 7,457,032 B2 | 11/2008 | Qiao et al. | |
| 7,483,203 B2 | 1/2009 | McKinstrie | |
| 7,630,126 B2 | 12/2009 | McKinstrie | |
| 7,764,423 B2 | 7/2010 | McKinstrie et al. | |
| 7,813,646 B2 | 10/2010 | Furey | |
| 7,844,154 B2 | 11/2010 | Bookbinder et al. | |
| 7,941,022 B1 | 5/2011 | Schaffner et al. | |
| 2006/0153498 A1 * | 7/2006 | Shen | 385/24 |
| 2009/0154879 A1 * | 6/2009 | Salokatve | G02B 6/2835 385/43 |
| 2011/0261580 A1 * | 10/2011 | Seo | G02B 6/2826 362/553 |
| 2012/0027339 A1 * | 2/2012 | Mathai et al. | 385/14 |

OTHER PUBLICATIONS

Schmidt, Alferness, R.V. et al, "Characteristics of Ti-diffused Lithium Niobate Optical Directional Couplers," Applied Optics, 1979, v.18, pp. 4012-4016.
U.S. Appl. No. 13/018,511, filed Feb. 2, 2011.
U.S. Appl. No. 61/433,437, filed Jan. 17, 2011.
International Search Report; Mailed on Dec. 27, 2012 for PCT Application No. PCT/US2012/038043.

* cited by examiner

100

200

300

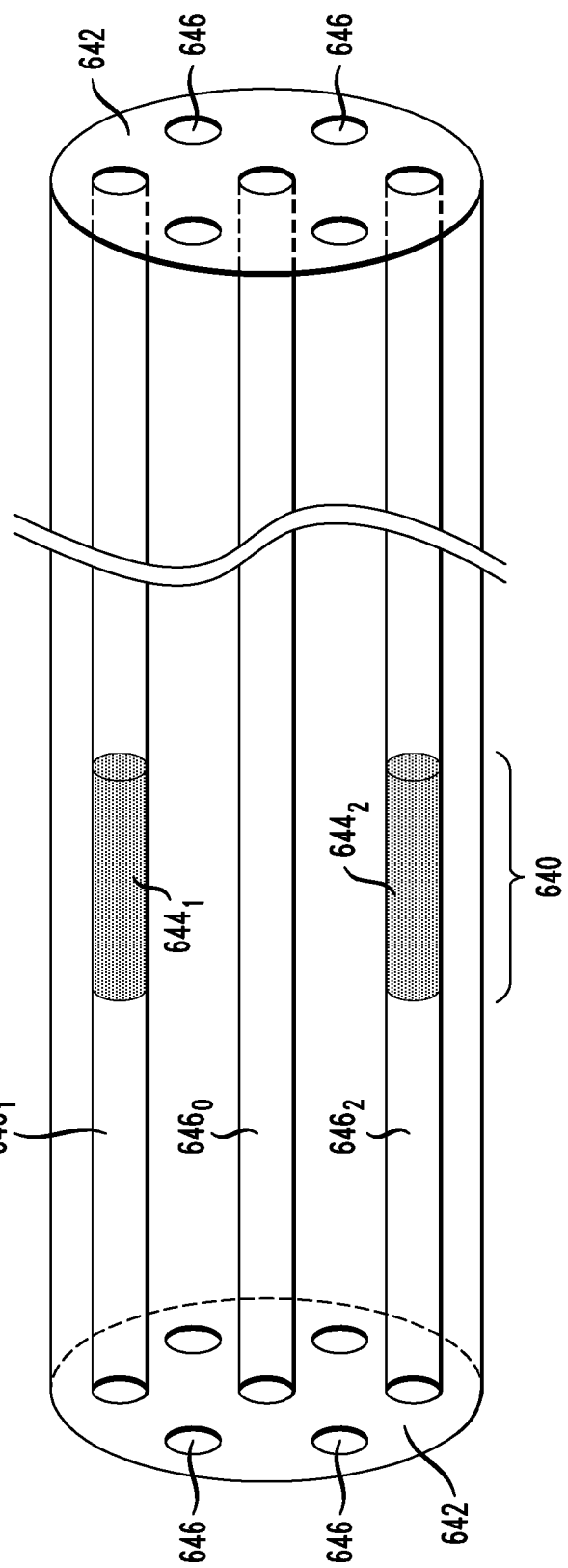

US 9,438,004 B2

OPTICAL PUMPING AND POWERING IN SPATIALLY MULTIPLEXED TRANSMISSION LINKS

BACKGROUND

1. Field of the Invention

The present invention relates to optical communication equipment and, more specifically but not exclusively, to optical pumping and powering in spatially multiplexed transmission links.

2. Description of the Related Art

This section introduces aspects that may help facilitate a better understanding of the invention(s). Accordingly, the statements of this section are to be read in this light and are not to be understood as admissions about what is in the prior art or what is not in the prior art.

A long-haul optical transmission link often employs (i) optical amplifiers to boost the energy of transmitted optical signals and (ii) optical performance-monitoring devices to assess the quality of the communication channel established over the link. The placement of optical amplifiers and optical performance-monitoring devices is typically dictated by physical accessibility and the availability of external electrical power along the link. However, some locations (e.g., in remote areas or in the ocean) that would otherwise be optimal for the placement of these and other functional elements of the optical transmission link do not always have access to an electrical-power grid. As a result, the actual configuration of the optical transmission link may be suboptimal, which may degrade certain performance characteristics of the link.

SUMMARY

Disclosed herein are various embodiments of a spatially multiplexed optical link having a plurality of transmission paths, wherein at least one transmission path is configured to carry an optical-pump signal while one or more other transmission paths carry data-bearing signals. Disposed within the optical link are an optical signal-distribution module and an amplifier module. The optical signal-distribution module is configured to couple portions of the optical-pump signal into the data-bearing transmission paths. The amplifier module is configured to amplify the data-bearing signals using these portions of the optical-pump signal as a power source in a suitable all-optical amplification scheme. Since neither the optical signal-distribution module nor the amplifier module needs external electrical power to operate, the amplifier module can advantageously be placed at any desired location within the optical link without regard to the availability at that location of external electrical power. The optical-pump signal can optionally be tapped and applied to a photovoltaic element configured to directly power a device, e.g., an optical performance monitor, or to charge the battery of that device to enable its autonomous operation if external electrical power is not available where the device is deployed.

According to one embodiment, provided is an apparatus comprising an optical signal-distribution module configured to end-connect to first and second multi-core optical fibers or optical fiber cables such that each optical core of the first multi-core optical fiber or optical fiber cable is end-connected to a corresponding optical core of the second multi-core optical fiber or optical fiber cable, wherein the optical signal-distribution module is configured to transfer a portion of optical power of one of the optical cores of the first multi-core optical fiber or optical fiber cable to one or more optical cores of the second multi-core optical fiber or optical fiber cable or to other one or more optical cores of the first multi-core optical fiber or optical fiber cable.

According to another embodiment, provided is an apparatus comprising a spatially multiplexed optical link having a plurality of transmission paths, wherein a first transmission path of the plurality is configured to transmit a first optical signal. The optical link comprises an optical-to-electrical (O/E) converter, an electronic device, and a first optical tap coupled within the first transmission path and configured to direct a first non-zero portion of optical power of the first optical signal to the O/E converter. The O/E converter is configured to convert said first non-zero portion of optical power of the first optical signal into electricity for powering the electronic device.

BRIEF DESCRIPTION OF THE DRAWINGS

Other aspects, features, and benefits of various embodiments of the invention will become more fully apparent, by way of example, from the following detailed description and the accompanying drawings, in which:

FIG. 6 shows a schematic three-dimensional view of a fiber-optic cable that can be used in the optical transport system of FIG. 1 according to one embodiment of the invention.

DETAILED DESCRIPTION

Figure 1:
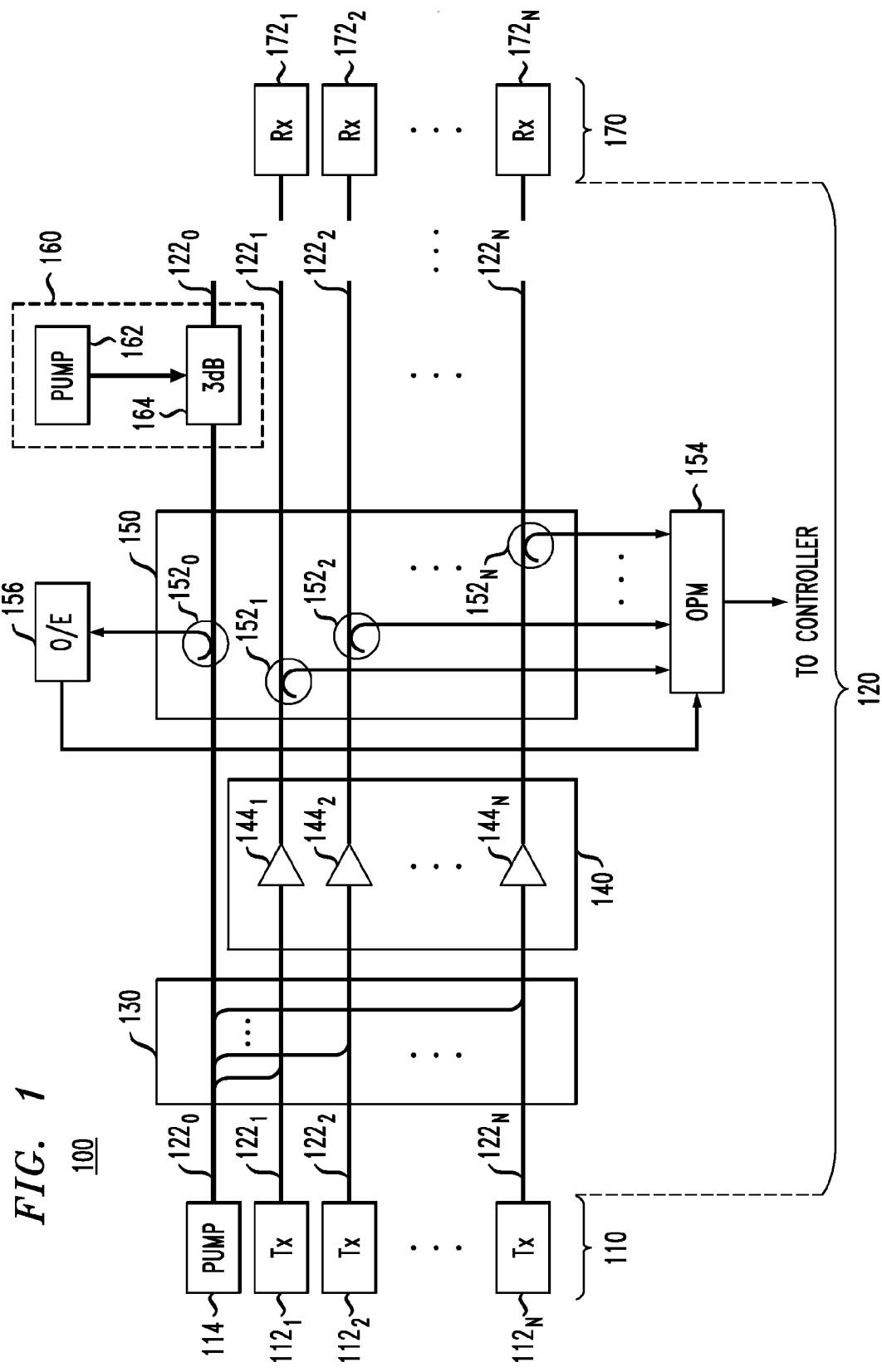
FIG. 1 shows a block diagram of an optical transport system according to one embodiment of the invention.

FIG. 1 shows a block diagram of an optical transport system 100 according to one embodiment of the invention. System 100 has an optical transmitter 110 and an optical receiver 170 coupled to one another via a spatially multiplexed optical transmission link 120. Optical link 120 is illustratively shown as having N+1 parallel transmission paths $122_0$-$122_N$, where N is a positive integer. As indicated in FIG. 1, transmission paths $122_1$-$122_N$ are used to transmit data-bearing signals generated by transmitter cards (Tx's) $112_1$-$112_N$, and transmission path $122_0$ is used to transmit one or more optical-pump signals generated by an optical-pump source (e.g., laser) 114. Optical receiver 170 has N receiver cards (Rx's) $172_1$-$172_N$ coupled to transmission paths $122_1$-$122_N$, respectively. Each receiver card 172 operates individually or in concert with other receiver cards to demodulate and decode the corresponding data-bearing signal that it receives via the corresponding one of transmission paths $122_1$-$122_N$. Transmission path $122_0$ may or may not terminate at optical receiver 170. For example, in one embodiment, transmission path $122_0$ may terminate within optical link 120 without extending all the way to optical receiver 170. In various embodiments, an individual path 122 may carry a single-wavelength signal or a wavelength-division-multiplexed (WDM) signal. The optical-pump signal in transmission path $122_0$ may similarly have several wavelengths (pump waves).

In an alternative embodiment, optical transmitter 110 may have more than one optical pump source analogous to optical-pump source 114 and fewer than N transmitter cards 112. Accordingly, optical receiver 170 is reconfigured to have fewer than N receiver cards 172, and optical link 120 is reconfigured to have a different allocation of its transmission paths $122_0$-$122_N$ between the data-bearing signals and optical-pump signals. For example, when optical transmitter 110 has N−1 transmitter cards $112_1$-$112_{N-1}$ and optical receiver 170 has N−1 receiver cards $172_1$-$172_{N-1}$, transmission paths $122_1$-$122_{N-1}$ of link 120 are used to transmit data-bearing signals. Transmission paths $122_0$ and $122_N$ are then used to transmit optical-pump signals generated by two optical-pump sources 114, one of which replaces transmitter card $112_N$ of FIG. 1. In general, not all transmitter cards 112 need to be co-located, and not all receiver cards 172 need to be collocated. For example, if optical transport system 100 is part of an optical mesh network, optical data-bearing signals may be added and/or dropped from each transmission path 122 wherever there is a corresponding add/drop node.

Transmission paths $122_0$-$122_N$ of optical link 120 can be implemented using multiple segments of multi-core optical fiber or fiber-optic cable serially connected between transmitter 110 and receiver 170. For example, in an embodiment corresponding to FIG. 1, one segment of the multi-core optical fiber or fiber-optic cable is coupled between transmitter 110 and a pump-distribution module 130. Another segment of the multi-core optical fiber or fiber-optic cable is coupled between pump-distribution module 130 and an amplifier module 140. Yet another segment of the multi-core optical fiber or fiber-optic cable is coupled between amplifier module 140 and a tap module 150. Still another segment of the multi-core optical fiber or fiber-optic cable is coupled between tap module 150 and a pump module 160, etc., until there is a last segment of the multi-core optical fiber or fiber-optic cable coupling receiver 170 to whatever element is immediately upstream of receiver 170.

If the segments are fiber-optic cables, then each fiber optic cable comprises a plurality of individual optical fiber strands. In each segment, a fiber strand serves as a corresponding portion of one of transmission paths 122 in optical transmission link 120. Representative fiber-optic cables that may be suitable for use in optical transmission link 120 are disclosed, e.g., in U.S. patent application Ser. No. 13/018, 511, filed on Feb. 1, 2011, which application is incorporated herein by reference in its entirety.

If the segments are multi-core optical fibers, then each core of one of the multi-core optical fibers serves as a corresponding portion of one of transmission paths 122 in optical transmission link 120 (also see FIG. 6). Representative multi-core optical fibers that may be suitable for use in optical transmission link 120 are disclosed, e.g., in U.S. Provisional Application Ser. No. 61/433,437, which was filed on Jan. 17, 2011, which application is incorporated herein by reference in its entirety.

In various alternative embodiments, optical link 120 may have one or more additional pump-distribution modules 130, one or more additional amplifier modules 140, one or more additional tap modules 150, and/or one or more additional pump modules 160 (none of which are explicitly shown in FIG. 1). The order in which these additional modules are arranged within optical link 120 may not necessarily be the same as that indicated in FIG. 1. In general, a pump module 160 is placed at a location where external electrical power is readily available. In contrast, none of pump-distribution module 130, amplifier module 140, and tap module 150 needs external electrical power to operate. As a result, each instance of any of these modules can be placed at any desired location within optical link 120.

Pump-distribution module 130 operates to couple the optical-pump signal from transmission path $122_0$ into transmission paths $122_1$-$122_N$. More specifically, pump-distribution module 130 is configured to couple (i) a first designated portion of the optical power of the optical-pump signal from transmission path $122_0$ to transmission path $122_1$, (ii) a second designated portion of the optical power of the optical-pump signal from transmission path $122_0$ to transmission path $122_2$, etc. The coupled portions may be the same or different. The optical coupling implemented in pump-distribution module 130 may be non-reciprocal, meaning that the pump-distribution module often transfers substantially no optical power from any one of transmission paths $122_1$-$122_N$ to transmission path $122_0$. This non-reciprocity can be achieved, e.g., using the fact that the optical-pump signal(s) and the optical data-bearing signals occupy different parts of the optical spectrum. Due to the optical signal coupling implemented in pump-distribution module 130, each of the transmission paths $122_1$-$122_N$ receiving optical power from transmission path $122_0$ carries, downstream or upstream from the pump-distribution module, the corresponding portion of the optical-pump signal, which coexists therein with the corresponding data-bearing signal. Representative embodiments of pump-distribution module 130 are described in more detail below in reference to FIGS. 2-5.

Amplifier module 140 has a plurality of optical amplifiers $144_1$-$144_N$. In a representative embodiment, optical amplifier 144 is an all-optical device that may not need external electrical power to operate. More specifically, optical amplifier 144 amplifies a data-bearing signal by transferring energy to the latter from the co-located optical-pump signal. The energy-transfer mechanism can be based, e.g., on stimulated emission, stimulated Raman scattering (SRS), optical parametric amplification, or any other suitable all-optical energy-transfer phenomenon. In various embodiments, each of optical amplifiers $144_1$-$144_N$ can be implemented as a distributed optical element or a lumped optical element.

In one embodiment, optical amplifier 144 is a doped-fiber amplifier. A doped-fiber amplifier uses a doped optical fiber as a gain medium, wherein the data-bearing signal is amplified through interactions with an optically excited dopant. More specifically, the optical-pump signal causes the doping ions to transition into an excited state. When photons of the data-bearing signal interact with the excited state, they can cause stimulated emission of photons at the wavelength of the data-bearing signal, thereby amplifying the latter. The gain spectrum of a doped-fiber amplifier can be relatively broad, e.g., about 30 nm, which makes this type of amplifier suitable for amplifying WDM signals. A well-known example of a doped-fiber amplifier is an Erbium-doped fiber amplifier (EDFA). An EDFA can be efficiently pumped with an optical-pump signal having a wavelength of about 980 nm or about 1480 nm, and provides a relatively high optical gain in the spectral region around 1550 nm.

In another embodiment, optical amplifier 144 is a Raman amplifier. A Raman amplifier relies on stimulated Raman scattering to transfer energy from the optical-pump signal to the data-bearing signal. Unlike a doped-fiber amplifier, whose optical-gain spectrum is constant and determined by the energy levels of the dopant, the Raman amplifier has an optical-gain spectrum that depends on the wavelength of the optical-pump signal, with the maximum optical gain occurring when the spectral separation between the optical-pump wavelength and the data-bearing wavelength is about 100 nm. Due to this characteristic, the optical-gain spectrum of the Raman amplifier can be tailored using two or more appropriately selected discrete pump wavelengths.

Another feature of the Raman amplifier is that the optical-pump signal may be coupled into the amplifier in the same direction as the data-bearing signal (co-directional pumping) or in the opposite direction (contra-directional pumping), or both. Note that the embodiment of optical link 120 shown in FIG. 1 is designed for co-directional pumping because pump-distribution module 130 is located upstream from amplifier module 140. To implement contra-directional pumping in optical link 120, the positions of pump-distribution module 130 and amplifier module 140 should be sequentially swapped, and pump-distribution module 130 should be configured to couple the optical-pump signal from transmission path $122_0$ to each of transmission paths $122_1$-$122_N$ so that, instead of being directed downstream (toward receiver 170), the coupled signals are directed upstream (toward transmitter 110). An embodiment of pump-distribution module 130 that is suitable for contra-directional pumping is described in more detail below in reference to FIG. 5.

In yet another embodiment, optical amplifier 144 is an optical parametric amplifier (OPA). An OPA is a device that produces coherent optical output via a suitable nonlinear optical process, such as four-wave mixing (FWM). Typically, one or two pump-wave photons are converted into two new photons with conservation of photon energy and momentum. One of the two new photons can have the same wavelength as the data-bearing signal, thereby amplifying the latter. Representative examples of optical parametric amplifiers that can be used in optical transmission link 120 as optical amplifiers 144 are disclosed, e.g., in commonly owned U.S. Pat. Nos. 7,164,526, 7,483,203, 7,630,126, and 7,764,423, all of which are incorporated herein by reference in their entirety.

Tap module 150 comprises a plurality of optical taps $152_0$-$152_N$, each of which is coupled to the corresponding one of transmission paths $122_0$-$122_N$. Each of optical taps $152_1$-$152_N$ is configured to divert a specified portion of light from the corresponding transmission path 122 to an optical performance monitor (OPM) 154, where the light is processed to assess the quality of the communication channel established over optical transmission link 120. Exemplary measurements that can be performed using optical performance monitor 154 are described in more detail, e.g., in U.S. Pat. Nos. 6,704,509, 7,035,505, 7,068,944, 7,130,505, 7,171,130, and 7,457,032, all of which are incorporated herein by reference in their entirety. Optical performance monitor 154 can communicate the measurement results, e.g., wirelessly or optically, to a channel controller (not explicitly shown in FIG. 1) that can use the measurement results to make appropriate adjustments to the configuration and operating parameters of system 100.

In a representative embodiment, optical performance monitor 154 is battery-operated, with the battery being configured for charging using an electrical current generated by an optical-to-electrical (O/E) converter (e.g., photovoltaic element) 156. O/E converter 156 generates electricity while being illuminated by light that is diverted by optical tap $152_0$ from transmission path $122_0$. To provide sufficient amounts of light, optical tap $152_0$ may be configured to divert a relatively large portion (e.g., more than about 50%) of the optical energy of the pump light from transmission path $122_0$. In this regard, the configuration of optical tap $152_0$ may differ from the configuration of optical taps $152_1$-$152_N$.

Optical pump module 160 operates to replenish the energy of the optical-pump signal in transmission path $122_0$. As already indicated above, the optical-pump signal is being attenuated and its energy is being depleted upstream from pump module 160, e.g., by the operation of pump-distribution module 130 and tap module 150, and also by optical losses in the multi-core optical fiber or fiber-optic cable. In one embodiment, pump module 160 comprises an optical-pump source 162 and an optical coupler 164. Optical-pump source 162 can be similar to optical-pump source 114 of transmitter 110 and configured to generate an optical-pump signal that has substantially the same spectral characteristics as the optical-pump signal generated by optical-pump source 114. Optical coupler 164 can be, e.g., a conventional 3-dB coupler configured to (i) combine the optical signals received from the upstream portion of transmission path $122_0$ and from optical-pump source 162 and (ii) apply the resulting combined signal to the downstream portion of transmission path $122_0$.

One skilled in the art will appreciate that optical pump module 160 can be placed at a location along optical link 120 where external electrical power (e.g., from the electrical power grid) is available. This location is also preferably selected so that at least one pump-distribution module 130 and/or tap module 150 is located downstream from optical pump module 160. If optical link 120 has a relatively short length, then optical pump module 160 becomes optional and may be removed from the link.

Figure 2:
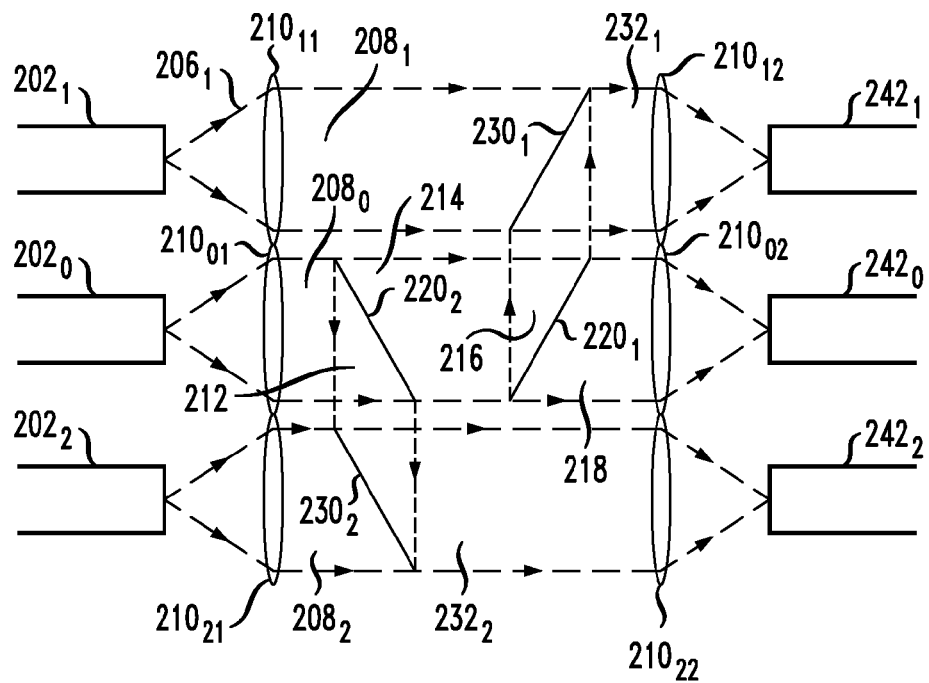
FIG. 2 shows a block diagram of a pump-distribution module that can be used in the optical transport system of FIG. 1 according to one embodiment of the invention.

FIG. 2 shows a block diagram of a pump-distribution module 200 that can be used as pump-distribution module 130 according to one embodiment of the invention. Pump-distribution module 200 is illustratively shown as having three input ports (e.g., fibers) $202_0$-$202_2$ and three output ports (e.g., fibers) $242_0$-$242_2$. Ports $202_0$ and $242_0$ are intended for being coupled to a transmission path that carries an optical-pump signal, such as transmission path $122_0$ (FIG. 1). Ports $202_1$ and $242_1$ are intended for being coupled to a transmission path that carries a data-bearing signal, such as transmission path $122_1$ (FIG. 1). Ports $202_2$ and $242_2$ are similarly intended for being coupled to another transmission path that carries a data-bearing signal, such as transmission path $122_2$ (FIG. 1). One of ordinary skill in the art will appreciate that the structure of pump-distribution module 200 can be modified to add more input/output ports that can be coupled to other transmission paths carrying data-bearing signals, such as transmission paths $122_3$-$122_N$ (FIG. 1).

In a representative configuration, each of input ports $202_1$-$202_2$ receives a corresponding data-bearing signal while input port $202_0$ receives an optical pump signal. Pump-distribution module 200 mixes the received signals as further described below, e.g., via uni-directional mixing. As a result, each of output ports $242_1$-$242_2$ outputs an optical signal having, as components, the data-bearing signal applied to the corresponding one of input ports $202_1$-$202_2$ and a corresponding portion of the optical-pump signal. Output port $242_0$ outputs the attenuated optical-pump signal.

Pump-distribution module 200 has a plurality of collimating lenses 210, each configured to either collimate a corresponding diverging beam of light or focus a corresponding collimated beam of light. For example, lens $210_{11}$ is configured to collimate an expanding beam $206_1$ that is coupled into pump-distribution module 200 through input port $202_1$.

Lens $210_{12}$ is configured to focus a light beam $232_1$ for directing that beam out of pump-distribution module 200 through output port $242_1$.

Pump-distribution module 200 further has a plurality of partially transparent mirrors 220 and dichroic mirrors 230. Partially transparent mirrors 220 are positioned between lenses $210_{01}$ and $210_{12}$, and each of these mirrors is configured to partially reflect and partially transmit the impinging light beam as indicated in FIG. 2. For example, partially transparent mirror $220_2$ acts as an optical-beam splitter that splits a collimated pump beam $208_0$ by reflecting a portion 212 of that beam toward dichroic mirror $230_2$ and transmitting the remaining portion 214 of that pump beam without changing its propagation direction. Partially transparent mirror $220_1$ similarly acts as an optical-beam splitter that splits beam 214 by reflecting a portion 216 of that beam toward dichroic mirror $230_1$ and transmitting the remaining portion 218 of that beam without changing its propagation direction.

Dichroic mirror $230_2$ is positioned between lenses $210_{21}$ and $210_{22}$ and is configured to act as an optical-beam combiner that combines beam 212 and a collimated light beam $208_2$. As known in the art, a dichroic mirror is a color filter designed to reflect light within a specified, relatively narrow wavelength band while passing through the wavelengths located outside that band. The spectral characteristics of dichroic mirror $230_2$ are such that the mirror reflects the pump wavelength(s) carried by beam 212 while transmitting the wavelength(s) of the data-bearing signal carried by beam $208_2$. A resulting light beam $232_2$ thus carries both a corresponding optical-pump signal and a corresponding data-bearing signal and is suitable for application to a corresponding one of optical amplifiers 144 (FIG. 1) that can be placed downstream from output port $242_2$.

Dichroic mirror $230_1$ is similarly positioned between lenses $210_{11}$ and $210_{12}$ and is configured to act as an optical-beam combiner that combines beam 216 and a collimated light beam $208_1$. The spectral characteristics of dichroic mirror $230_1$ are such that the mirror reflects the pump wavelengths carried by beam 216 while transmitting the wavelengths of the data-bearing signal carried by beam $208_1$. The resulting light beam $232_1$ thus carries both a corresponding optical-pump signal and a corresponding data-bearing signal and is suitable for application to a corresponding one of optical amplifiers 144 (FIG. 1).

Figure 3:
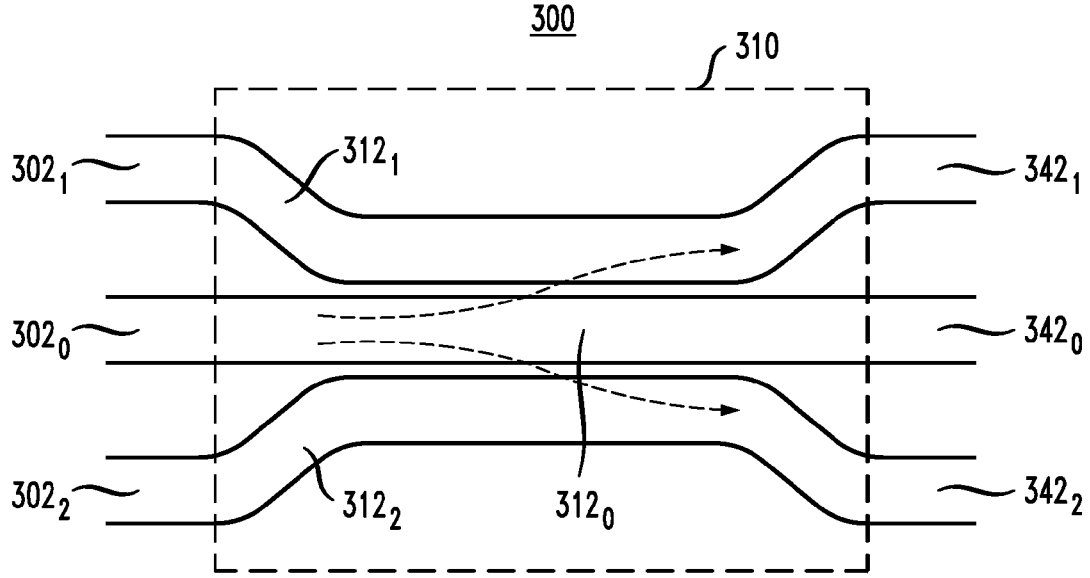
FIG. 3 shows a block diagram of a pump-distribution module that can be used in the optical transport system of FIG. 1 according to another embodiment of the invention.

FIG. 3 shows a block diagram of a pump-distribution module 300 that can be used as pump-distribution module 130 according to another embodiment of the invention. Pump-distribution module 300 is illustratively shown as having three input ports (e.g., optical waveguides) $302_0$-$302_2$ and three output ports (e.g., optical waveguides) $342_0$-$342_2$. Ports $302_0$ and $342_0$ are intended for being coupled to a transmission path that carries an optical-pump signal, such as transmission path $122_0$ (FIG. 1). Ports $302_1$ and $342_1$ are intended for being coupled to a transmission path that carries a data-bearing signal, such as transmission path $122_1$ (FIG. 1). Ports $302_2$ and $342_2$ are similarly intended for being coupled to another transmission path that carries a data-bearing signal, such as transmission path $122_2$ (FIG. 1). One of ordinary skill in the art will appreciate that the structure of pump-distribution module 300 can be modified to add more input/output ports that can be coupled to other transmission paths carrying data-bearing signals, such as transmission paths $122_3$-$122_N$ (FIG. 1).

In a representative configuration, each of input ports $302_1$-$302_2$ receives a corresponding data-bearing signal while input port $302_0$ receives an optical-pump signal. Pump-distribution module 300 mixes the received signals as further described below. As a result, each of output ports $342_1$-$342_2$ outputs an optical signal having, as components, the data-bearing signal applied to the corresponding one of input ports $302_1$-$302_2$ and a corresponding portion of the optical-pump signal. Output port $342_0$ outputs the attenuated optical-pump signal.

Pump-distribution module 300 comprises optical waveguides $312_0$-$312_2$ that are coupled between input ports 302 and output ports 342 as indicated in FIG. 3 and configured to form an evanescent waveguide coupler 310. The separation between optical waveguides $312_0$ and $312_1$ within coupler 310 is relatively small, which enables an evanescent wave from one waveguide to excite a guided propagation mode in the other waveguide. As a result, an optical-pump signal from waveguide $312_0$ is able to partially couple into waveguide $312_1$ as indicated by the upper arrow in FIG. 3. The separation between optical waveguides $312_0$ and $312_2$ within coupler 310 is also relatively small, which similarly enables the optical-pump signal from waveguide $312_0$ to partially couple into waveguide $312_2$ as indicated by the lower arrow in FIG. 3.

In general, the optical-power-transfer efficiency between optical waveguides $312_0/312_1$ and $312_0/312_2$ within waveguide coupler 310 depends on the wavelengths of the optical signals and the longitudinal size (length) of the coupler. In one embodiment, the length of waveguide coupler 310 is selected so that (i) the optical-pump signal from waveguide $312_0$ couples into each of waveguides $312_1$ and $312_2$ with relatively high efficiency and (ii) the optical data-bearing signals from waveguides $312_1$ and $312_2$ couple into waveguide $312_0$ with relatively low efficiency. Practical guidance on determining a proper length of waveguide coupler 310 can be found, e.g., in an article by R. C. Alferness, R. V. Schmidt, and E. H. Turner, "Characteristics of Ti-diffused Lithium Niobate Optical Directional Couplers," Applied Optics, 1979, v. 18, pp. 4012-4016, which article is incorporated herein by reference in its entirety.

One of ordinary skill in the art will recognize that, in alternative embodiments, pump-distribution module 300 can be implemented using suitable interference filters, such as an arrayed waveguide grating or a ring resonator, and/or a suitably configured Mach-Zehnder interferometer.

For example, the optical coupling between waveguides $312_0$ and $312_1$ can be implemented using a first 2×2 Mach-Zehnder interferometer (MZI), and the optical coupling between waveguides $312_0$ and $312_2$ can be implemented using a second 2×2 Mach-Zehnder interferometer (not explicitly shown in FIG. 3). For each of the Mach-Zehnder interferometers the free spectral range (FSR) is chosen to be twice the frequency separation between the pump signal and the carrier frequency of the corresponding data-bearing signal. The principle of operation of the MZI-based coupler can be understood using waveguides $312_0$ and $312_1$ as an illustration. Assume that (i) the pump signal enters input port $302_0$ and the data-bearing signal enters input port $302_1$, and (ii) the corresponding Mach-Zehnder interferometer is tuned such that constructive interference for the pump signal is observed at output port $342_1$ (meaning that the Mach-Zehnder interferometer is configured for very efficient signal cross-over at the pump wavelength). Then, the FSR of twice the frequency separation between the pump signal and the carrier frequency of the data-bearing signal will cause the data-bearing signal to pass through the Mach-Zehnder interferometer from input port $302_1$ to output port $342_1$ with a close to zero cross-over efficiency. By adjusting the FSR of the Mach-Zehnder interferometer, the amount of crosscoupled pump power can be adjusted while leaving the power of the data-bearing signal substantially un-coupled. A monitoring device may be useful to ensure that the Mach-Zehnder interferometer is appropriately configured to operate as described above.

Figure 4:
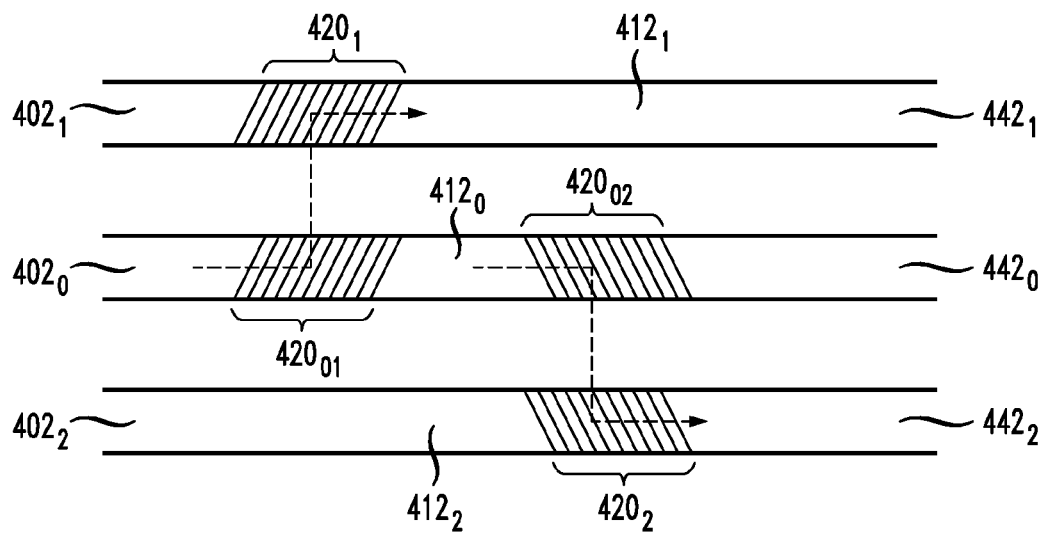
FIG. 4 shows a block diagram of a pump-distribution module that can be used in the optical transport system of FIG. 1 according to yet another embodiment of the invention.

FIG. 4 shows a block diagram of a pump-distribution module 400 that can be used as pump-distribution module 130 according to yet another embodiment of the invention. Pump-distribution module 400 is illustratively shown as having three input ports (e.g., optical waveguides) $402_0$-$402_2$ and three output ports (e.g., optical waveguides) $442_0$-$442_2$. Ports $402_0$ and $442_0$ are intended for being coupled to a transmission path that carries an optical-pump signal, such as transmission path $122_0$ (FIG. 1). Ports $402_1$ and $442_1$ are intended for being coupled to a transmission path that carries a data-bearing signal, such as transmission path $122_1$ (FIG. 1). Ports $402_2$ and $442_2$ are similarly intended for being coupled to another transmission path that carries a data-bearing signal, such as transmission path $122_2$ (FIG. 1). One of ordinary skill in the art will appreciate that the structure of pump-distribution module 400 can be modified to add more input/output ports that can be coupled to other transmission paths carrying data-bearing signals, such as transmission paths $122_3$-$122_N$ (FIG. 1).

In a representative configuration, each of input ports $402_1$-$402_2$ receives a corresponding data-bearing signal while input port $402_0$ receives an optical-pump signal. Pump-distribution module 400 mixes the received signals as further described below. As a result, each of output ports $442_1$-$442_2$ outputs an optical signal having, as components, the data-bearing signal applied to the corresponding one of input ports $402_1$-$402_2$ and a corresponding portion of the optical-pump signal. Output port $442_0$ outputs the attenuated optical-pump signal.

Pump-distribution module 400 comprises optical waveguides $412_0$-$412_2$ that are coupled between input ports 402 and output ports 442 as indicated in FIG. 4. Optical waveguide $412_0$ includes distributed Bragg reflectors $420_{01}$ and $420_{02}$. Optical waveguide $412_1$ includes a distributed Bragg reflector $420_1$. Optical waveguide $412_2$ includes a distributed Bragg reflector $420_2$.

Each of reflectors 420 has a plurality of alternating layers having different refractive indices and oriented at an angle of approximately 45 degrees with respect to the longitudinal axis of the host waveguide. The thicknesses of the alternating layers in distributed Bragg reflectors $420_{01}$ and $420_{02}$ are selected so that each of these distributed Bragg reflectors reflects a corresponding wavelength of the optical pump signal. Note that reflectors $420_{01}$ and $420_{02}$ may be designed for reflecting the same wavelength or different wavelengths. The thicknesses of the alternating layers in distributed Bragg reflector $420_1$ are selected so that it reflects the same pump wavelength as distributed Bragg reflector $420_{01}$ at a certain reflection strength while transmitting the wavelengths of the data-bearing signal traveling through waveguide $412_1$. The thicknesses of the alternating layers in distributed Bragg reflector $420_2$ are similarly selected so that it reflects the same pump wavelength as distributed Bragg reflector $420_{02}$ while transmitting the wavelengths of the data-bearing signal traveling through waveguide $412_2$. Due to this configuration of distributed Bragg reflectors 420 in pump-distribution module 400, the optical-pump signal applied to input port $402_0$ is coupled into waveguides $412_1$-$412_2$ and directed to output ports $442_1$-$442_2$ as indicated by the arrows in FIG. 4.

U.S. Pat. No. 5,016,967 discloses a waveguide coupler certain aspects of which can be used to design additional embodiments of pump-distribution module 400. This patent is incorporated herein by reference in its entirety.

Figure 5:
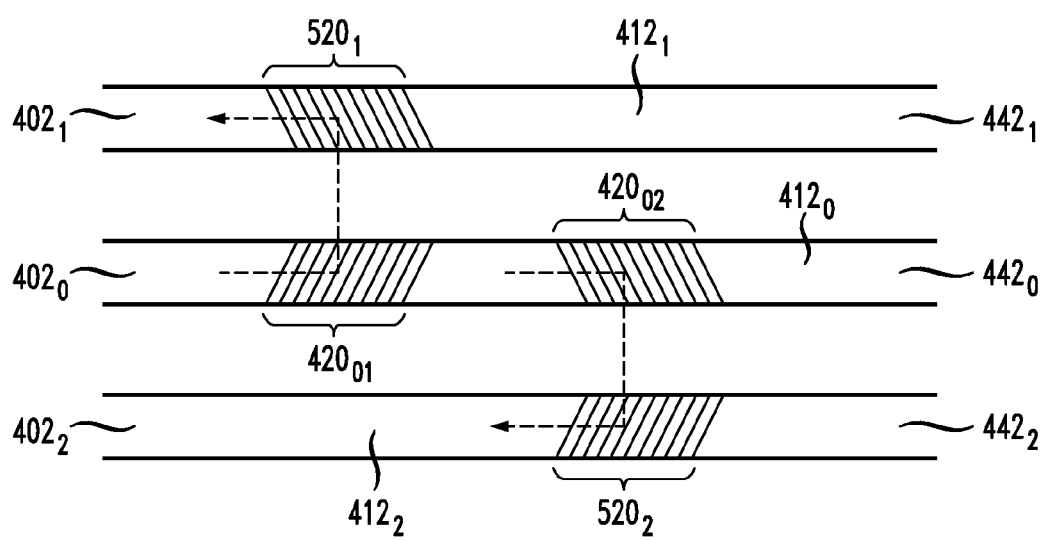
FIG. 5 shows a block diagram of a pump-distribution module that can be used in the optical transport system of FIG. 1 according to yet another embodiment of the invention.

FIG. 5 shows a block diagram of a pump-distribution module 500 that can be used as pump-distribution module 130 according to yet another embodiment of the invention. Pump-distribution module 500 is generally similar to pump-distribution module 400 of FIG. 4 and has many of the same elements. The description of these elements is not repeated here. However, one difference between pump-distribution modules 400 and 500 is that, in the latter, distributed Bragg reflectors $420_1$ and $420_2$ are replaced by distributed Bragg reflectors $520_1$ and $520_2$, respectively. Distributed Bragg reflector $520_1$ differs from distributed Bragg reflector $420_1$ by the orientation of the alternating layers, which causes distributed Bragg reflector $520_1$ to direct the received pump wavelength toward input port $402_1$, instead of directing it toward output port $442_1$. Distributed Bragg reflector $520_2$ similarly differs from distributed Bragg reflector $420_2$ by the orientation of the alternating layers, which causes distributed Bragg reflector $520_2$ to direct the received pump wavelength toward input port $402_2$, instead of directing it toward output port $442_2$. As already indicated above, pump-distribution module 500 can be used for contra-directional pumping of an amplifier module in optical link 120 (FIG. 1).

FIG. 6 shows a schematic three-dimensional view of a multi-core optical fiber or fiber-optic cable 600 that can be used in optical link 120 according to one embodiment of the invention. More specifically, fiber or cable 600 can be used, e.g., to implement a section of optical link 120 between pump-distribution module 130 and tap module 150 (see FIG. 1). Cable 600 includes an amplification section 640 that can function as amplifier module 140 (FIG. 1).

In embodiments where fiber or cable 600 is a multi-core fiber, the multi-core fiber has an optical cladding 642 and a plurality of optical cores 646 enclosed within the optical cladding. The diameter of each core 646 can be chosen to cause the core to support either a single guided mode or multiple guided modes. In one embodiment, cable 600 has N+1 cores 646, with each of said cores providing a corresponding transmission path for the optical link. For clarity, only three cores, i.e., cores $646_0$-$646_2$ are shown in the drawing.

Cores $646_1$ and $646_2$ are configured for transmitting data-bearing signals. Within amplification section 640, each of cores $646_1$ and $646_2$ has a corresponding doped segment 644 that can operate as a doped-fiber amplifier. Therefore, if at the input terminus of cable 600 an appropriate optical-pump signal is coupled into core $646_1$ together with the corresponding data-bearing signal, then the data-bearing signal gets amplified in doped segment $644_1$. Due to the energy transfer from the optical-pump signal to the data-bearing signal within doped segment $644_1$, the optical-pump signal gets depleted and has a low or negligible intensity downstream from the doped segment. Doped segment $644_2$ operates in a similar manner to (i) amplify the data-bearing signal coupled into core $646_2$ and (ii) deplete the optical-pump signal coupled into that core.

Core $646_0$ is configured for transmitting an optical pump signal and differs from cores $646_1$ and $646_2$ in that, within amplification section 640, core $646_0$ does not have a corresponding doped segment. As a result, the optical-pump signal coupled into core $646_0$ traverses amplification section 640 without being significantly attenuated.

While this invention has been described with reference to illustrative embodiments, this description is not intended to be construed in a limiting sense.

Although pump-distribution module 130 has been described in reference to non-reciprocal coupling of an optical-pump signal from one transmission path to one or more other transmission paths, the various embodiments are not so limited. Pump-distribution module 130 can similarly be configured for non-reciprocal coupling of any other optical signal from one transmission path to one or more other transmission paths. In this configuration, pump-distribution module 130 is more appropriately referred to as an optical signal-distribution module.

Although O/E converter 156 has been described as being configured to charge a battery of OPM 154, it can similarly be configured to charge a battery of any other battery-powered device.

Contra-directional pumping is not limited to Raman amplifiers and can be used with other amplifier types when deemed beneficial.

Various modifications of the described embodiments, as well as other embodiments of the invention, which are apparent to persons skilled in the art to which the inventions pertain are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of the inventions may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The various present inventions may be embodied in other specific apparatus and/or methods. The described embodiments are to be considered in all respects as only illustrative and not restrictive. In particular, the scope of the inventions is indicated by the appended claims rather than by the description and figures herein. All changes that come within the meaning and range of equivalency of the claims are to be embraced within their scope.

The description and drawings merely illustrate the principles of the inventions. It will thus be appreciated that those of ordinary skill in the art will be able to devise various arrangements that, although not explicitly described or shown herein, embody the principles of the inventions and are included within its spirit and scope. Furthermore, all examples recited herein are principally intended expressly to be only for pedagogical purposes to aid the reader in understanding the principles of the inventions and the concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof.

What is claimed is:

1. An apparatus comprising an optical signal-distribution module configured to end-connect to first and second multi-core optical fibers such that each optical core of the first multi-core optical fiber is end-connected to a corresponding optical core of the second multi-core optical fiber, wherein the optical signal-distribution module is configured to:
   transfer a portion of optical power of a first optical core of the first multi-core optical fiber to each of two or more optical cores of the second multi-core optical fiber; and
   transfer optical power of each of the one or more second optical cores of the first multi-core optical fiber to a corresponding one of the two or more optical cores of the second multi-core optical fiber.

2. The apparatus of claim 1, wherein the optical signal-distribution module includes a first optical interface configured to end couple individual optical cores therein to corresponding ones of the optical cores of the first multi-core optical fiber and includes a second optical interface configured to end couple individual optical cores therein to corresponding ones of the optical cores of the second multi-core optical fiber.

3. The apparatus of claim 1, further comprising the first multi-core optical fiber and the second multi-core optical fiber.

4. The apparatus of claim 3, wherein:
   the second multi-core optical fiber includes rare-earth doped optical amplification media along segments of some of the optical cores therein; and
   the optical signal-distribution module is configured to direct the portion of the optical power to the segments of the some of the optical cores.

5. The apparatus of claim 1, wherein the optical signal-distribution module is configured to transfer the portion of the optical power such that substantially no optical power of said one or more second optical cores is transferred from said one or more second optical cores to said first optical core.

6. The apparatus of claim 1, further comprising one or more optical amplifiers end-connected to said one or more second optical cores, wherein:
   the optical signal-distribution module is configured to direct the portion of the optical power to said one or more optical amplifiers; and
   said one or more optical amplifiers are configured to optically amplify optical signals received from said one or more second optical cores using the portion of the optical power as a power source.

7. The apparatus of claim 1, further comprising:
an optical pump source configured to apply the optical power to said first optical core; and
a plurality of optical transmitters configured to apply respective optical data-bearing signals to said one or more second optical cores.

8. The apparatus of claim 7, further comprising a plurality of optical receivers configured to receive said respective optical data-bearing signals via said two or more optical cores of the second multi-core optical fiber.

9. The apparatus of claim 1, further comprising:
an optical-to-electrical (O/E) converter;
an electronic device; and
a first optical tap coupled to the first optical core and configured to direct a second portion of the optical power to the O/E converter, wherein the O/E converter is configured to convert said second portion of the optical power into electricity for powering the electronic device.

10. The apparatus of claim 9, further comprising one or more additional optical taps, each coupled to a respective one of said one or more second optical cores and configured to direct a respective portion of optical power of a respective optical signal from the respective one of said one or more second optical cores to the electronic device.

11. The apparatus of claim 10, wherein the electronic device is an optical performance monitor configured to:
process said respective portions to assess a communication channel established over the first and second multi-core optical fibers; and
communicate assessment results to a channel controller.

12. The apparatus of claim 1, wherein the optical signal-distribution module comprises:
a first input port connected to the first optical core of the first multi-core optical fiber and a first output port connected to a first of the two or more optical cores of the second multi-core optical fiber;
a second input port connected to one of the one or more second optical cores of the first multi-core optical fiber and a second output port connected to a second of the two or more optical cores of the second multi-core optical fiber;
an optical-beam splitter configured to receive a first optical signal from the first input port; and
an optical-beam combiner configured to receive a second optical signal from the second input port, wherein:
the optical-beam splitter is further configured to:
split the first optical signal into a first split signal and a second split signal;
direct the first split signal to the optical-beam combiner; and
direct the second split signal to the first output port; and
the optical-beam combiner is further configured to:
combine the first split signal and the second optical signal to produce a combined signal; and
direct the combined signal to the second output port.

13. The apparatus of claim 12, wherein the optical-beam combiner comprises a dichroic mirror.

14. The apparatus of claim 1, wherein the optical signal-distribution module comprises:
a first input port connected to the first optical core of the first multi-core optical fiber and a first output port connected to a first of the two or more optical cores of the second multi-core optical fiber;
a second input port connected to one of the second optical cores of the first multi-core optical fiber and a second output port connected to a second of the two or more optical cores of the second multi-core optical fiber;
a first waveguide coupled between the first input port and the first output port;
a second waveguide coupled between the second input port and the second output port; and
an evanescent or interference-based waveguide coupler configured to couple optical power from the first waveguide into the second waveguide.

15. The apparatus of claim 1, wherein the optical signal-distribution module comprises:
a first input port connected to the first optical core of the first multi-core optical fiber and a first output port connected to a first of the two or more optical cores of the second multi-core optical fiber;
a second input port connected to one of the second optical cores of the first multi-core optical fiber and a second output port connected to a second of the two or more optical cores of the second multi-core optical fiber;
a first waveguide coupled between the first input port and the first output port;
a second waveguide coupled between the second input port and the second output port, wherein:
the first waveguide comprises a first distributed Bragg reflector;
the second waveguide comprises a second distributed Bragg reflector;
the first distributed Bragg reflector is configured to:
split a first optical signal received from the first input port into a first split signal and a second split signal;
direct the first split signal to the second distributed Bragg reflector; and
direct the second split signal to the first output port; and
the second distributed Bragg reflector is configured to:
combine the first split signal and a second optical signal received from the second input port to produce a combined signal; and
direct the combined signal to the second output port.

16. The apparatus of claim 1, wherein the optical signal-distribution module comprises:
a first input port connected to the first optical core of the first multi-core optical fiber and a first output port connected to a first of the two or more optical cores of the second multi-core optical fiber;
a second input port connected to one of the second cores of the first multi-core optical fiber and a second output port connected to a second of the two or more optical cores of the second multi-core optical fiber;
a first waveguide coupled between the first input port and the second output port;
a second waveguide coupled between the second input port and the second output port, wherein:
the first waveguide comprises a first distributed Bragg reflector;
the second waveguide comprises a second distributed Bragg reflector;
the first distributed Bragg reflector is configured to:
split a first optical signal received from the first input port into a first split signal and a second split signal;
direct the first split signal to the second distributed Bragg reflector; and
direct the second split signal to the first output port; and
the second distributed Bragg reflector is configured to:

direct the first split signal to the second input port; and pass a second optical signal received from the second input port to the second output port.

17. The apparatus of claim 1, wherein the optical signal-distribution module is configured to transfer the portion of the optical power to the one or more second optical cores of the first multi-core optical fiber.

18. The apparatus of claim 1, wherein the optical signal-distribution module is configured to transfer the optical power such that substantially no optical power of said one or more second optical cores is transferred to at least one of the two or more optical cores of the second multi-core optical fiber.

19. An apparatus comprising an optical signal-distribution module configured to end-connect to first and second multi-core optical fibers or optical fiber cables such that each optical core of the first multi-core optical fiber or optical fiber cable is end-connected to a corresponding optical core of the second multi-core optical fiber or optical fiber cable, wherein the optical signal-distribution module is configured to transfer a portion of optical power of one of the optical cores of the first multi-core optical fiber or optical fiber cable to one or more optical cores of the second multi-core optical fiber or optical fiber cable or to other one or more optical cores of the first multi-core optical fiber or optical fiber cable, wherein the optical signal-distribution module comprises:

a first input port connected to a first core of the first multi-core optical fiber or optical fiber cable and a first output port connected to a first core of the second multi-core optical fiber or optical fiber cable;

a second input port connected to a second core of the first multi-core optical fiber or optical fiber cable and a second output port connected to a second core of the second multi-core optical fiber or optical fiber cable;

an optical-beam splitter configured to receive a first optical signal from the first input port; and an optical-beam combiner configured to receive a second optical signal from the second input port, wherein:

the optical-beam splitter is further configured to:
split the first optical signal into a first split signal and a second split signal;
direct the first split signal to the optical-beam combiner; and
direct the second split signal to the first output port; and the optical-beam combiner is further configured to:
combine the first split signal and the second optical signal to produce a combined signal; and
direct the combined signal to the second output port.

20. The apparatus of claim 19, wherein the optical-beam combiner comprises a dichroic mirror.

* * * * *